(12) United States Patent
Flavin et al.

(10) Patent No.: US 12,009,590 B2
(45) Date of Patent: Jun. 11, 2024

(54) COVER FOR A VEHICLE, IN PARTICULAR FOR A SUPERSONIC OR HYPERSONIC VEHICLE

(71) Applicant: MBDA FRANCE, Le Plessis-Robinson (FR)

(72) Inventors: Edouard Flavin, Le Plessis Robinson (FR); Guillaume Fontenas, Le Plessis Robinson (FR); Antoine Rosso, Le Plessis Robinson (FR)

(73) Assignee: MBDA FRANCE, Le Plessis-Robinson (FR)

( * ) Notice: Subject to any disclaimer, the term of this patent is extended or adjusted under 35 U.S.C. 154(b) by 253 days.

(21) Appl. No.: 17/626,906

(22) PCT Filed: Jul. 10, 2020

(86) PCT No.: PCT/FR2020/051253
§ 371 (c)(1),
(2) Date: Jan. 13, 2022

(87) PCT Pub. No.: WO2021/019139
PCT Pub. Date: Feb. 4, 2021

(65) Prior Publication Data
US 2022/0263235 A1    Aug. 18, 2022

(30) Foreign Application Priority Data

Jul. 26, 2019 (FR) ...................................... 1908398

(51) Int. Cl.
*H01Q 1/42* (2006.01)
*B32B 3/04* (2006.01)
(Continued)

(52) U.S. Cl.
CPC ............... *H01Q 1/422* (2013.01); *B32B 3/04* (2013.01); *B32B 7/05* (2019.01); *B32B 9/005* (2013.01);
(Continued)

(58) Field of Classification Search
CPC ................................. H01Q 1/422; H01Q 1/27
See application file for complete search history.

(56) References Cited

U.S. PATENT DOCUMENTS

| 4,520,364 A | * | 5/1985 | Perry | ........................ H01Q 1/42 343/872 |
| 5,483,894 A | * | 1/1996 | Facciano | .................. F42B 15/00 102/377 |

(Continued)

FOREIGN PATENT DOCUMENTS

| CN | 111934080 A | * | 11/2020 | |
| CN | 114784489 A | * | 7/2022 | .............. H01P 5/107 |

(Continued)

OTHER PUBLICATIONS

Honda Nadir, "Design of UWB antenna integrating geopolymer dielectric" May 31, 2018, Retrieved from the Internet: https://www.researchgate.neUpublication/3 24909039_Design_of_UWB_Antennas_Integrating_Geopolymer_Material/link/5aeaacc4a6fdcc03cd90cb 7 d/download.

*Primary Examiner* — Ricardo I Magallanes
*Assistant Examiner* — Jordan E. DeWitt
(74) *Attorney, Agent, or Firm* — Browdy and Neimark, PLLC

(57) ABSTRACT

The antenna (3) cover (1) for a vehicle is designed to cover at least one antenna (3) mounted on the vehicle, the cover (1) being made of composite material with a ceramic matrix reinforced by oxide fibers. The antenna cover (1) is resistant to high temperatures while not posing any sealing problem
(Continued)

and remaining transparent to the frequencies used for the antennas (3) of the vehicle.

9 Claims, 1 Drawing Sheet

(51) Int. Cl.
| | |
|---|---|
| *B32B 7/05* | (2019.01) |
| *B32B 9/00* | (2006.01) |
| *B32B 15/00* | (2006.01) |
| *B32B 15/04* | (2006.01) |
| *B32B 15/20* | (2006.01) |
| *B64C 1/38* | (2006.01) |
| *H01Q 1/02* | (2006.01) |
| *H01Q 1/27* | (2006.01) |
| *B64G 1/58* | (2006.01) |

(52) U.S. Cl.
CPC ............ *B32B 15/00* (2013.01); *B32B 15/04* (2013.01); *B32B 15/043* (2013.01); *B32B 15/20* (2013.01); *B64C 1/38* (2013.01); *H01Q 1/02* (2013.01); *H01Q 1/27* (2013.01); *B32B 2262/10* (2013.01); *B32B 2307/212* (2013.01); *B32B 2307/304* (2013.01); *B32B 2307/412* (2013.01); *B32B 2307/732* (2013.01); *B32B 2605/18* (2013.01); *B64G 1/58* (2013.01)

(56) References Cited

U.S. PATENT DOCUMENTS

| | | | | |
|---|---|---|---|---|
| 5,486,399 | A * | 1/1996 | Brydon | H01Q 1/422 |
| | | | | 428/193 |
| 5,738,750 | A * | 4/1998 | Purinton | C04B 35/62222 |
| | | | | 156/286 |
| 7,420,523 | B1 * | 9/2008 | Ziolkowski | H01Q 1/422 |
| | | | | 343/872 |
| 8,715,439 | B2 * | 5/2014 | Chakrabarti | C04B 37/025 |
| | | | | 428/545 |
| 8,765,230 | B1 * | 7/2014 | Waldrop, III | H01Q 1/02 |
| | | | | 343/872 |
| 9,419,333 | B1 * | 8/2016 | Muench | C04B 41/009 |
| 2007/0228211 | A1 * | 10/2007 | Facciano | F41G 7/2246 |
| | | | | 244/3.19 |
| 2008/0117113 | A1 * | 5/2008 | Haziza | H01Q 13/0233 |
| | | | | 343/786 |
| 2008/0136731 | A1 * | 6/2008 | Wu | F41H 5/0428 |
| | | | | 343/872 |
| 2010/0103072 | A1 * | 4/2010 | Wu | H01Q 1/422 |
| | | | | 156/278 |
| 2012/0092229 | A1 * | 4/2012 | Wu | H01Q 1/422 |
| | | | | 343/872 |
| 2013/0141289 | A1 * | 6/2013 | Vortmeier | H01Q 1/48 |
| | | | | 343/711 |
| 2015/0207213 | A1 * | 7/2015 | Forslund | H01Q 17/00 |
| | | | | 343/713 |
| 2016/0020512 | A1 * | 1/2016 | Pinney | H01Q 1/42 |
| | | | | 343/705 |
| 2016/0380345 | A1 * | 12/2016 | Kolak | H01Q 1/422 |
| | | | | 343/872 |
| 2018/0013203 | A1 * | 1/2018 | Wangsvick | H01Q 21/205 |
| 2018/0097288 | A1 * | 4/2018 | DiDomenico | G06V 20/17 |
| 2019/0190140 | A1 * | 6/2019 | Lavin | H01Q 1/422 |
| 2019/0288384 | A1 * | 9/2019 | DiChiara | B05D 1/02 |
| 2020/0041641 | A1 * | 2/2020 | Kocharyan | G01S 13/931 |
| 2020/0339053 | A1 * | 10/2020 | Bicego | G01S 13/931 |
| 2021/0135368 | A1 * | 5/2021 | Rogers | H01Q 9/0457 |
| 2021/0159593 | A1 * | 5/2021 | Cho | C08F 222/103 |
| 2022/0029281 | A1 * | 1/2022 | Fischer | G01S 7/028 |
| 2022/0037767 | A1 * | 2/2022 | Yun | H01Q 1/2291 |
| 2022/0263235 | A1 * | 8/2022 | Flavin | H01Q 1/02 |
| 2022/0404539 | A1 * | 12/2022 | Bajec Strle | G02B 6/006 |

FOREIGN PATENT DOCUMENTS

| | | | | |
|---|---|---|---|---|
| EP | 3771035 | A1 * | 1/2021 | ............ B32B 15/00 |
| FR | 3093961 | A1 * | 9/2020 | ........... H01Q 1/3233 |
| WO | 2010117474 | A2 | 10/2010 | |
| WO | WO-2010117474 | A2 * | 10/2010 | ............... H01Q 1/42 |
| WO | WO-2011051931 | A1 * | 5/2011 | ............. H01Q 1/002 |

* cited by examiner

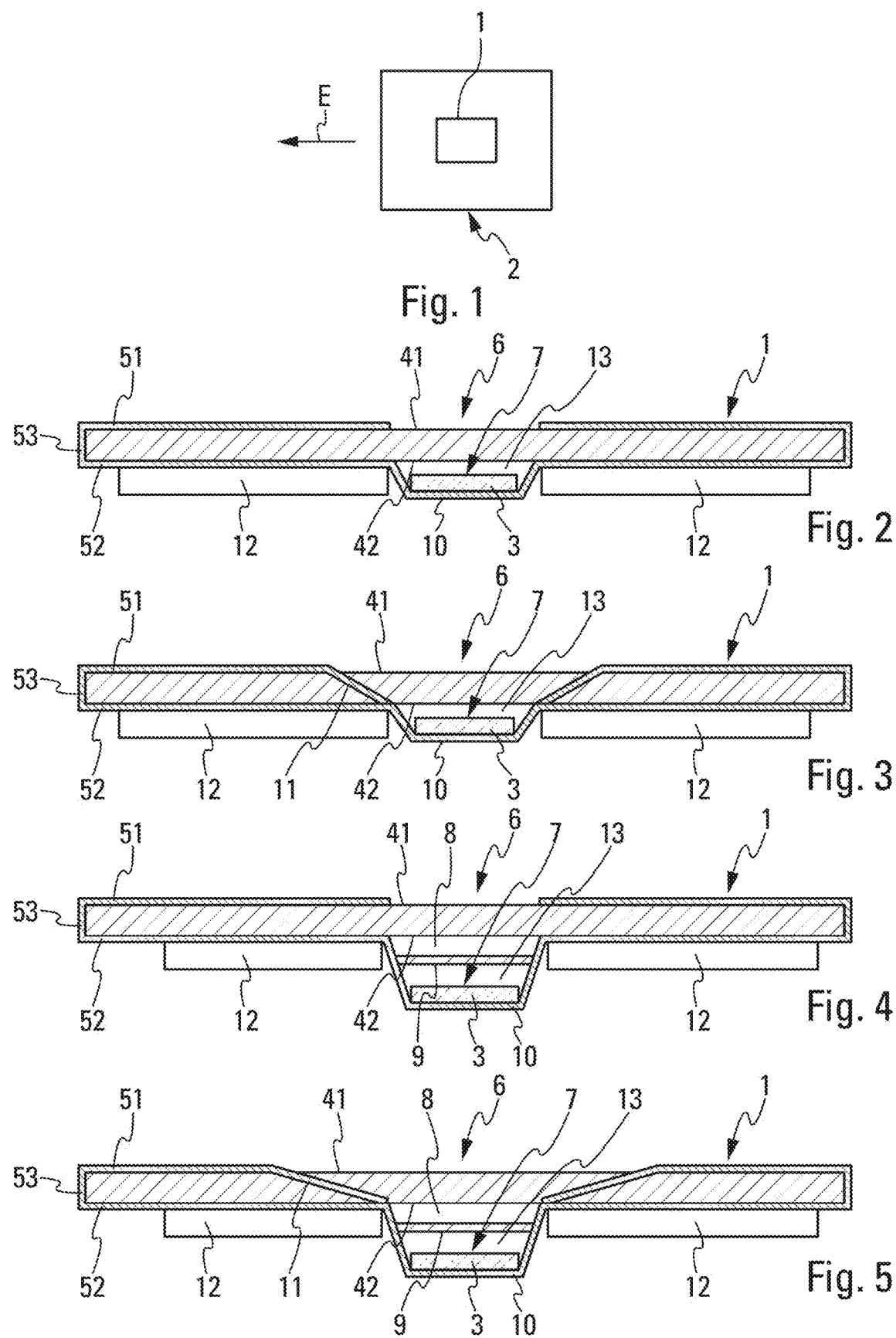

COVER FOR A VEHICLE, IN PARTICULAR FOR A SUPERSONIC OR HYPERSONIC VEHICLE

TECHNICAL FIELD

The present invention relates to the field of vehicles, in particular aeronautical vehicle or spacecraft cruising at supersonic or hypersonic speeds. More particularly, it concerns a structural and aerodynamic antenna cover of complex shape adapted to integrate at least one antenna radome and capable of withstanding high temperatures. In addition, this antenna cover is capable of withstanding high temperatures.

BACKGROUND

During a flight, the external surface of a supersonic or hypersonic vehicle is likely to reach temperatures of several hundred degrees Celsius. Indeed, the friction of the air on the external surface of the vehicle leads to a significant heating of this external surface. In addition, a breakage in the external surface caused by the presence of an element fitted on this external surface can create a thermal bridge to the internal structure of the vehicle, joint problems, an aerodynamic brake or a stopping point that becomes extremely hot.

The question that arises under these extremely severe conditions concerns the integration of antenna radomes and how to limit the undesirable effects described above. First of all, it is necessary to have materials capable of withstanding temperatures in particular of between 500° C. and 1100° C.

One solution is to make a cover from a superalloy, such as an "Inconel" or a refractory metal, such as molybdenum or a titanium-zirconium-molybdenum (TZM) alloy. Openings are then embodied in the cover facing the areas provided with an antenna. Transparent ceramic radomes adapted to the operating frequencies of the antennas are then fitted and secured to the cover to close each of these openings.

The superalloys or the refractory metals allow the cover to withstand high temperatures. However, the superalloys, such as "Inconels", have mechanical properties that collapse at temperatures above 700° C. or 800° C. An additional thermal protection must therefore be provided to increase the resistance to high temperatures, which increases the mass of the cover. Furthermore, the refractory metals have high thermal conductivity, which will promote the thermal leakage that could heat up the internal structure of the vehicle.

Another solution allowing the cover to withstand high temperatures is to make the cover of ceramic composite material whose matrix is made of carbon and/or silicon carbide and whose fibres are made of carbon and/or silicon carbide. As with the previous solution, openings are embodied in the cover facing the areas provided with an antenna. Radomes of transparent ceramic with the operating frequencies of the antennas are then attached to the cover.

Such a ceramic composite material is capable of withstanding temperatures well above the temperatures encountered during the operation of the vehicle. However, the manufacture of parts with large and complex shapes is usually very expensive due to the necessary implementation methods such as the CVD method (Chemical Vapor Deposition) and the related methods. In addition, the geometries that can be made from these materials are sometimes limited.

Finally, for the two solutions mentioned above, the establishment of a seal between the cover and the radome or the radomes has a real difficulty due to the different expansion coefficients between the materials of the latter. The attachment devices will also generate surface breakages and additional hot spots.

SUMMARY OF THE INVENTION

The purpose of the present invention is to overcome these disadvantages by proposing a cover for vehicle that is resistant to mechanical stresses in flight and to high temperatures without altering its sealing or its transparency at the frequencies of use of the antennas.

To this end, the invention relates to an antenna cover for a vehicle, the cover being configured to cover at least one antenna attached to the vehicle.

According to the invention, the cover is made of composite material with a ceramic matrix reinforced by oxide fibres.

Thus, thanks to the invention, the antenna cover is resistant to high temperatures. It also remains transparent to the frequencies of use of the antennas of the vehicle. Therefore, it does not present any sealing problem because the creation of openings closed by radomes attached on the cover is not necessary.

According to a first embodiment, the ceramic matrix of the composite material corresponds to an oxide matrix, configured to be transparent in a frequency band of electromagnetic waves used by the antenna or the antennas.

According to a second embodiment, the ceramic matrix of the composite material corresponds to a geopolymer matrix, configured to be transparent in a frequency band of electromagnetic waves used by the antenna or the antennas.

In addition, the cover has an external surface covered with at least one first metal layer except on one or more portions of the cover intended to come facing the antenna or the antennas.

In addition, the cover has an internal surface covered by at least one second metal layer except on the portion or the portions of the cover intended to come facing the antenna or the antennas, the second metal layer being connected to the first metal layer.

Furthermore, the cover is arranged so that a spacing exists between, on the one hand, the internal surface of the cover and, on the other hand, the antenna or each of the antennas, the spacing comprising an air plate.

Advantageously, the spacing further comprises a layer of thermal insulation covering the internal surface of the cover intended to come facing the antenna or each of the antennas and a layer of composite material with a ceramic matrix reinforced by oxide fibres covering the layer of thermal insulation, the air plate being located between, on the one hand, the antenna or each of the antennas and, on the other hand, the layer of composite material.

In addition, the second metal layer is configured to be connected to a ground of the antenna or each of the antennas.

In addition, the first metal layer is configured to be connected to the ground of the antenna or each of the antennas by an extension through the cover.

According to a particularity, the cover further comprises a thermal protection layer arranged on the internal surface of the cover.

The invention also relates to a vehicle comprising at least one antenna cover, as described above.

BRIEF DESCRIPTION OF FIGURES

The invention, with its characteristics and advantages, will become clearer on reading the description made with reference to the attached drawings in which:

FIG. 1 schematically shows a vehicle equipped with the cover,

FIG. 2 schematically represents a cross-section of the cover according to a first variant, FIG. 3 schematically represents a cross-section of the cover according to a second variant, FIG. 4 schematically represents a cross-section of the cover according to a third variant, FIG. 5 schematically represents a cross-section of the cover according to a fourth variant.

DETAILED DESCRIPTION

The antenna cover 1 is intended to be attached to any type of supersonic or hypersonic vehicle 2, to cover at least one antenna 3 (FIG. 1). The vehicle 2 is provided with one or more antennas 3 which may be used to emit signals or to receive signals. The emitted signals may be signals representative of information detected by sensors. The received signals may be signals representative of control commands of the vehicle 2.

In a non-limiting manner, the vehicle 2 may correspond to a missile, a space vehicle or a reservoir.

FIG. 1 schematically shows a vehicle 2 on which a cover 1 is attached. The cover 1 may be attached to the front of the vehicle 2 in the direction of travel E of the vehicle 2. FIG. 2 shows the direction of travel E of the vehicle 2 by an arrow. The tip of the arrow is directed in the direction of the front of the vehicle 2. The cover 1 may also be attached to another segment of the vehicle 2 or form the entire cover of the vehicle 2.

The cover 1 thus covers all or part of the supersonic or hypersonic vehicle 2, ensuring a mechanical and aerodynamic connection.

The cover 1 is made of composite material with a ceramic matrix reinforced by oxide fibres.

The ceramic matrix composite materials, in particular with an oxide or geopolymer matrix, are particularly adapted to withstand temperatures in the range of 500° C. to 1100° C. Moreover, they have the particularity of being electrically insulating and transparent in the frequency band of the electromagnetic waves used by the antenna or the antennas 3 to carry the received and emitted signals. This avoids the need to make openings facing the antenna or the antennas 3, thus avoiding surface breakage generated by the presence of fitted elements, such as radomes. Thus, the aerodynamic shape of the cover 1 is not degraded by surface breakages. The radome or the radomes are thus directly integrated into the cover 1.

Moreover, the fact that the radomes do not have to be attached at the level of openings embodied in the cover 1 avoids thermal bridge problems as well as expansion, joint and attachment problems between different materials of the cover 1 and the radomes. By forming the entire cover of the vehicle 2, there is no need for any attachment area between different elements intended to form a cover. The cover 1, which forms the entire cover of the vehicle 2, fulfils the mechanical function of the assembly of the fairing as well as the transparency function to the electromagnetic waves of a radome.

In addition, the mass of such a cover 1 is lower than if it had been made of metal. Indeed, the density of such a ceramic matrix composite material is of the order of 2.5 while that of a metal is of the order of 8 to 10. In addition, the manufacturing cost is lower than if it had been made of a commonly used composite material such as a composite material with a carbon ceramic matrix reinforced by silicon carbide fibres.

For example, and in a non-limiting manner, the oxide fibres correspond to aluminium oxide fibres ($Al_2O_3$), zirconium oxide fibres ($ZrO_2$), silicon oxide fibres ($SiO_2$), a mixture of oxide fibres such as mullite fibres.

According to a first embodiment, the ceramic matrix corresponds to an oxide matrix, configured to be transparent in a frequency band of electromagnetic waves used by the antenna 3 or the antennas 3.

For example, and in a non-limiting manner, the oxide matrix can be of the same nature as the above-mentioned fibres. For example, the oxide matrix corresponds to an aluminium oxide matrix, a zirconium oxide matrix or a silicon oxide matrix.

According to a second embodiment, the ceramic matrix corresponds to a geopolymer matrix, configured to be transparent in a frequency band of electromagnetic waves used by the antenna 3 or the antennas 3.

For example, and in a non-limiting manner, the geopolymer corresponds to one or more aluminium phosphates, to one or more silicates or to one or more aluminosilicates.

In a non-limiting manner, the cover 1 can have a thickness between 0.75 mm and 4 mm.

Advantageously, the cover 1 has an external surface 41 covered with at least one metal layer 51 except on one or more portions 6 of the cover 1 intended to come facing the antenna or the antennas 3 (FIGS. 2, 3, 4 and 5).

For example, and in a non-limiting manner, the metal layer 51 may be made of nickel, silver, copper and/or any other layer allowing to create an opacity in a radar wave frequency band (leading to a metal behaviour of the structure of the vehicle 1).

This metal layer 51 allows to ensure a flow of the electrical loads over the surface of the cover 1. It may also allow to ensure an electromagnetic shielding and/or a stealth for the vehicle 2. The uncovered portion or portions 6 allow the passage of signals likely to be emitted or received by the antenna or the antennas 3 of the vehicle 2.

The cover 1 may also have an internal surface 42 covered with at least one metal layer 52 except on the portion or the portions 6 of the cover 1 intended to come facing the antenna or the antennas 3. The metal layer 52 is connected to the metal layer 51. For example, the metal layer 51 and the metal layer 52 are connected together by a metal layer 53 covering a slice of the cover 1 between the external surface 41 and the internal surface 42. This metal layer 53 allows to establish an electrical connection between the two metal layers 51 and 52.

The metal layers 51 and 52 are sufficiently thin so as not to create surface breakages.

In a non-limiting manner, the metal layer 51 and the metal layer 52 have a thickness in the range of 0.01 mm to 1 mm.

The part or the portions 6 not covered by the metal layers 51 and 52 thus act as the radome of the antenna or the antennas 3 intended to come facing this portion or these portions 6. The architecture or the thickness of the portion or the portions 6 is adapted to ensure a maximum transparency in a frequency band of the electromagnetic waves used by the antenna or the antennas 3.

According to an alternative embodiment (FIGS. 2 and 3), the cover 1 is arranged so that a spacing 7 exists between, on the one hand, the internal surface 42 of the cover 1 and, on the other hand, the antenna 3 or each of the antennas 3 in a mounted position of the cover 1. The term "mounted position of the cover 1" means that the cover 1 is mounted on the vehicle 2. Advantageously, the spacing 7 comprises an air plate 13. The thickness of the air plate 13 is adapted to limit the heating of the antenna or the antennas 3 intended to come facing the portions 3 not covered by the metal layer or layers 51 and 52.

For example, and in a non-limiting manner, the air plate 13 has a thickness of between 1 mm and 5 mm. The thickness of the air plate can be limited to facilitate its integration.

According to another embodiment (FIGS. 4 and 5), the spacing 7 may further comprise a layer of thermal insulation 8 covering the internal surface 42 of the cover 1 intended to come facing the or each of the antennas 3 and a layer 9 of composite material with a ceramic matrix reinforced by oxide fibres covering the layer of thermal insulation 8. The air plate 13 is thus located between, on the one hand, the antenna 3 or each of the antennas 3 and, on the other hand, the layer 9 of composite material.

The thermal insulation layer 8 has a thickness resulting from a compromise between the level of transparency over the operating frequency band of the antenna or the antennas 3 and the insulating capabilities of the insulation. For example, and in a non-limiting manner, the thermal insulation layer 8 has a thickness of between 1 mm and 10 mm.

Preferably, the metal layer 52 is configured to be connected (electrically) to a ground 10 of the antenna 3 or each of the antennas 3 (FIGS. 2 and 4). This connection allows the evacuation of the electrical loads that are likely to form on the internal surface 42 of the cover 1.

Similarly, the metal layer 51 is configured to be connected (electrically) to the ground 10 of the antenna 3 or each of the antennas 3 by an extension 11 through the cover 1 (FIGS. 3 and 5). This connection also allows the evacuation of the electrical loads that are likely to form on the external surface 41 of the cover 1.

The cover 1 may further comprise a thermal protection layer 12 arranged on the internal surface 42 of the cover 1. The thermal protection layer 12 may cover the metal layer 52.

The thermal protection layer 12 has a thickness calculated to meet an internal temperature specification. For example, and without limitation, the thermal protection layer 12 has a thickness between 2 mm and 10 mm.

The invention claimed is:

1. An antenna cover for a vehicle, the cover being intended to cover at least one antenna attached to the vehicle, wherein the cover is made of composite material with a ceramic matrix reinforced by oxide fibres,
   wherein the cover has an external surface covered with at least one first metal layer except on one or more portions of the cover intended to come facing the antenna or the antennas,
   wherein the cover has an internal surface covered by at least one second metal layer except on the one or more portions of the cover intended to come facing the antenna or the antennas, the second metal layer being connected to the first metal layer by a metal layer covering an edge of the cover between the external surface and the internal surface.

2. The cover according to claim 1,
   wherein the ceramic matrix of the composite material corresponds to an oxide matrix, configured to be transparent in a frequency band of electromagnetic waves used by the antenna or the antennas.

3. The cover according to claim 1,
   wherein the ceramic matrix of the composite material corresponds to a geopolymer matrix, configured to be transparent in a frequency band of electromagnetic waves used by the antenna or the antennas.

4. The cover according to claim 1,
   wherein the cover is arranged so that a spacing exists between, on the one hand, the internal surface of the cover and, on the other hand, the antenna or each of the antennas in a mounted position of the cover, the spacing comprising an air plate.

5. The cover according to claim 4,
   wherein the spacing further comprises a layer of thermal insulation covering the internal surface of the cover intended to come facing the antenna or each of the antennas and a layer of composite material with a ceramic matrix reinforced by oxide fibres covering the layer of thermal insulation, the air plate being located between, on the one hand, the antenna or each of the antennas and, on the other hand, the layer of composite material.

6. The cover according to claim 1,
   wherein the second metal layer is configured to be connected to a ground of the antenna or each of the antennas.

7. The cover according to claim 1,
   wherein the first metal layer is configured to be connected to the ground of the antenna or each of the antennas by an extension (11) through the cover.

8. The cover according to claim 1,
   further comprising a thermal protection layer (12) arranged on the internal surface of the cover.

9. A vehicle, comprising at least one cover as specified according to claim 1.

* * * * *